US008594241B2

(12) United States Patent
Kim

(10) Patent No.: US 8,594,241 B2
(45) Date of Patent: Nov. 26, 2013

(54) ESTIMATION AND COMPENSATION METHOD FOR IQ IMBALANCE

(75) Inventor: Beom-Jin Kim, Seongnam (KR)

(73) Assignee: FCI Inc., Gyeonggi-Do (KR)

( * ) Notice: Subject to any disclaimer, the term of this patent is extended or adjusted under 35 U.S.C. 154(b) by 609 days.

(21) Appl. No.: 12/819,167

(22) Filed: Jun. 18, 2010

(65) Prior Publication Data
US 2010/0329397 A1 Dec. 30, 2010

(30) Foreign Application Priority Data

Jun. 30, 2009 (KR) .................. 10-2009-0058919

(51) Int. Cl.
*H03D 3/00* (2006.01)
*H04B 17/00* (2006.01)
(52) U.S. Cl.
USPC .......................................... 375/322; 375/224
(58) Field of Classification Search
USPC .................. 375/322, 224, 229, 260, 219; 455/127.2, 63.1, 302
See application file for complete search history.

(56) References Cited

U.S. PATENT DOCUMENTS

| 2005/0276354 | A1 | 12/2005 | Su et al. |
| 2007/0286307 | A1* | 12/2007 | Hayashi et al. ............... 375/297 |
| 2008/0089443 | A1* | 4/2008 | Sanada et al. ................. 375/319 |
| 2008/0212662 | A1* | 9/2008 | Lee et al. ...................... 375/224 |
| 2012/0269245 | A1* | 10/2012 | Mehrmanesh et al. ....... 375/224 |

FOREIGN PATENT DOCUMENTS

| CN | 1697432 A | 11/2005 |
| CN | 1984101 A | 6/2007 |

* cited by examiner

*Primary Examiner* — Khai Tran

(57) ABSTRACT

The present invention relates to a method and apparatus for estimating and compensating IQ imbalance of a baseband sampling digital communication receiver in digital time domain. Specifically, after an analog-to-digital converter (ADC) in the baseband sampling system, a structure including a crosstalk gain estimator, a Q-path gain estimator, an IQ imbalance compensator, and a lock detector is utilized to execute IQ imbalance estimation and compensation. In contrast to real-time frequency domain estimator/compensator, the present invention requires very little or no additional memory and delay processing, and therefore provides the estimation apparatus and method with convenience.

23 Claims, 7 Drawing Sheets

ESTIMATION AND COMPENSATION METHOD FOR IQ IMBALANCE

CLAIM OF PRIORITY

This application claims priority to Korean Patent Application No. 10-2009-0058919 filed on Jun. 30, 2009.

TECHNICAL FIELD OF THE INVENTION

The present invention relates to a method and apparatus for compensating IQ imbalance in digital time domain of a baseband sampling digital communication receiver.

BACKGROUND OF THE INVENTION

In an analog domain of a baseband sampling digital communication receiver, a radio frequency (RF) or intermediate frequency (IF) signal is down-converted into a baseband signal. The baseband signal is then converted into a digital signal by an analog-to-digital converter (ADC). Under such circumstances, the signal will be split into an in-phase (I) signal and a quadrature (Q) signal by a local oscillator using two sine waves with the same gain but a phase shift of 90 degrees (specifically, a sine wave and a cosine wave) when the signal is down-converted to a baseband signal.

However, such procedures are executed in the analog domain, therefore errors are possible to be generated. Especially, gain errors and phase errors may be generated between the sine wave and cosine wave used in the down conversion. Such errors may severely influence the performance of the receiver. This is so called IQ imbalance. In general, the gain error is about 1~5%, and the phase error is about 1~5 degrees. At this time, the IQ imbalance causes a gain imbalance between I and Q paths, or causes crosstalk interference from either the I or Q signals to the other one and vice versa. When the interference is great, the performance of the receiver will be significantly degraded.

Especially in an orthogonal frequency division multiplexing receiver, sub-carrier data located at symmetric positions of positive and negative frequencies interfere each other due to the affect of the IQ imbalance, and thereby resulting in a serious problem of poor performance in the IQ imbalance level.

Nowadays, there are several techniques and method for the IQ imbalance estimation and compensation. In particularly, the estimation techniques include a data aided offline estimator, a real-time frequency domain estimator, a real-time time domain estimator and many others.

The data aided offline estimator utilizes a method in which a prediction signal of a sine wave is inputted to the receiver so as to estimate the IQ imbalance. The aforesaid method can achieve high accuracy but with a problem, such that in responding to the variation due to an RF element or RF chip, it is necessary to calibrate the element or chip.

The real-time frequency domain estimator utilizes the fact that the positive frequency component and negative frequency component interfere with each other at symmetric positions in the frequency domain so as to estimate the interference quantity. Accordingly, an IQ imbalance compensator generally compensates the estimated interference in frequency domain. The compensation can be carried out in time domain. However, under such circumstances, complicated calculations such as square root, arcsine and so on are necessary to implement the gain and phase errors by hard wired logic. Using the real-time frequency domain estimator is the main means for the orthogonal frequency division multiplexing (OFDM) receiver. However, it is more complicated to realize it. This is because normal orthogonal frequency division multiplexing symbol data and the data obtained by symmetrically exchanging the positive and negative frequency data with respect to DC, are required when estimation is executed in frequency domain. Therefore, an additional memory having a capacity which is the length of the OFDM symbol is required, and an additional delay with a size of the OFDM symbol is also required.

Currently, the real-time time domain estimator utilizes the following method: directly calculating the gain and phase errors, and directly calculating compensating values for crosstalk and quadrature paths. However, there are disadvantages, huge data must be used, otherwise, the use of such a estimator will be problematic. In addition, complicated calculations such as division and square root are required when it is designed with hard wired logic.

The present invention relates to a real-time time domain estimation method and provides a digital phase-locked loop (PLL) estimator. The gain and phase errors or compensation gain values of the crosstalk and quadrature paths and an IQ imbalance compensation value are not directly calculated. Instead, a proper error detector is used to make the residual crosstalk as well as a mismatch between the residual quadrature and in-phase gain become 0. In addition, the gain values required for crosstalk and quadrature paths are tracked via a feedback loop.

Further, the present invention provides a method, in which time domain compensator has to co-work with the digital PLL real-time time domain estimator.

SUMMARY OF THE INVENTION

To solve the problems mentioned above, an objective of the present invention is to provide a method and apparatus for estimating and compensating IQ imbalance of a general baseband sampling digital communication receiver including orthogonal frequency division multiplexing (OFDM) receiver at real-time in digital time domain.

Further, the real-time time domain estimator and compensator in accordance with the present invention are different from the real-time frequency domain estimator/compensator in that an additional memory and delay processing are not necessary. Therefore, the present invention provides the estimation apparatus and method with convenience.

To solve the above problems, the IQ imbalance estimating and compensating method in a baseband sampling system is characterized in that: after an analog-to-digital converter, the structure comprises a crosstalk gain estimator, a quadrature path (Q-path) gain estimator, an IQ imbalance compensator, a lock detector and executes the IQ imbalance estimation and compensation.

At this time, the present invention has another feature. In the crosstalk gain estimator, an average power of the in-phase (I) signal is multiplied by a crosstalk gain value, and (what?) is compared to a cross correlation value of the I and Q signals to obtain a result. When the result is greater than a high threshold weight, a crosstalk gain, which is decreased by a predetermined gain scaling value, is updated to a crosstalk gain register. When the result is less than a low threshold weight, the crosstalk gain, which is increased by a predetermined gain scaling value, is updated to the crosstalk gain register. Under conditions other than the above-mentioned two cases, the crosstalk gain remains unchanged.

Under such circumstances, the present invention has a further feature. The average power of the I signal and the cross correlation value of the I, and Q signals are calculated from formulas 2 and 3.

$$P_I = E[\text{Re}\{y(n)\}]$$ (Formula 2)
$$= \frac{1}{N}\sum_{n=0}^{N-1}[\text{Re}\{y(n)\}]^2$$

$$C_{IQ} = |E[\text{Re}\{y(n)\}\text{Im}\{y(n)\}]|$$ (Formula 3)
$$= \left|\frac{1}{N}\sum_{n=0}^{N-1}\text{Re}\{y(n)\}\text{Im}\{y(n)\}\right|$$

The present invention has still a further feature. The high threshold weight is set to be greater than 1, and the low threshold weight is set to be less than 1. The predetermined gain scaling value to be decreased is set to be less than 1. The predetermined gain scaling value to be increased is determined depending on the state of the lock detector. The gain scaling value when the lock detector is at an "unlock" state is set to be less than the gain scaling value when the lock detector is at a "lock" state.

The present invention has yet another further feature. In the Q-path gain estimator, the average power of the I signal is compared with an average power of an imbalance compensated Q signal to obtain a result. When the result is greater than the high threshold value, a Q-path gain, which is increased by a predetermined gain scaling value, is updated to a Q-path gain register. When the result is less than a low threshold weight, the Q-path gain, which is decreased by a predetermined gain scaling value, is updated to the Q-path gain register. Under conditions other than the above-mentioned two cases, the original Q-path gain is maintained.

The present invention has still yet another further feature. The average power of the I signal and an average power of the Q signal are calculated from formulas 2 and 5.

$$P_{Q,C} = E[\text{Im}\{y_C(n)\}]$$ (Formula 5)
$$= \frac{1}{N}\sum_{n=0}^{N-1}[\text{Im}\{y_C(n)\}]^2$$

Under such circumstances, the present invention has still a further feature. The high threshold weight is set to be greater than 1, and the low threshold weight is set to be less than 1. The predetermined gain scaling value to be decreased is set to be less than 1. The predetermined gain scaling value is determined depending on the state of the lock detector. The gain scaling value when the lock detector is at an "unlock" state is set to be less than the gain scaling value when the lock detector is at a "lock" state. The predetermined gain scaling value to be increased is set to be greater than 1. The predetermined gain scaling value is determined depending on the state of the lock detector. The gain scaling value when the lock detector is at an "unlock" state is set to be greater than the gain scaling value when the lock detector is at a "lock" state.

The present invention has a further feature. The lock detector is switched from the "unlock" state to the "lock" state under the following conditions: when the crosstalk gain in the crosstalk gain estimator is not updated and remains unchanged, in addition, a total IQ imbalance measurement period is longer than a predetermined period; and the "lock" state is switched to "unlock" state only according to the resetting of the system.

Under such circumstances, the present invention is characterized in that the values of the crosstalk gain register and Q-path register are updated when the lock detector is at the "unlock" state.

When the lock detector is at the "lock" state, the values of the crosstalk gain register and the Q-path register can be updated, or it is also possible that the values of the crosstalk gain register and the Q-path register are no longer updated.

The present invention has still a further feature. In the IQ imbalance compensator, the value of the crosstalk gain register is multiplied by the I signal to obtain the crosstalk component, the crosstalk component is removed from the Q signal, and then the crosstalk removed Q signal is multiplied by the value of the Q-path gain register so as to compensate the gain of the Q-path.

The present invention has still a further feature. In the IQ imbalance compensator, the compensation is done as follows: the Q signal is multiplied by the value of the Q-path gain register to compensate the gain of the Q-path, and then the crosstalk component obtained by multiplying the value of the crosstalk gain register by the I signal is removed from the Q signal, of which the gain has been compensated.

The present invention has still a further feature. The IQ imbalance estimator and compensator are provided after an analog-to-digital converter (ADC) and a DC offset remover.

As described above, according to the IQ imbalance estimating and compensating method of the present invention, in the general baseband sampling digital communication receiver including the OFDM receiver, the real-time time domain estimator and compensator are used. Different from the real-time frequency domain estimator/compensator, no additional memory and delay processing are needed. Therefore, the IQ imbalance estimating apparatus and method provide effectiveness and convenience.

BRIEF DESCRIPTION OF THE DRAWINGS

The present invention will be described in detail in conjunction with the appending drawings, in which.

DETAILED DESCRIPTION OF THE INVENTION

Figure 1:
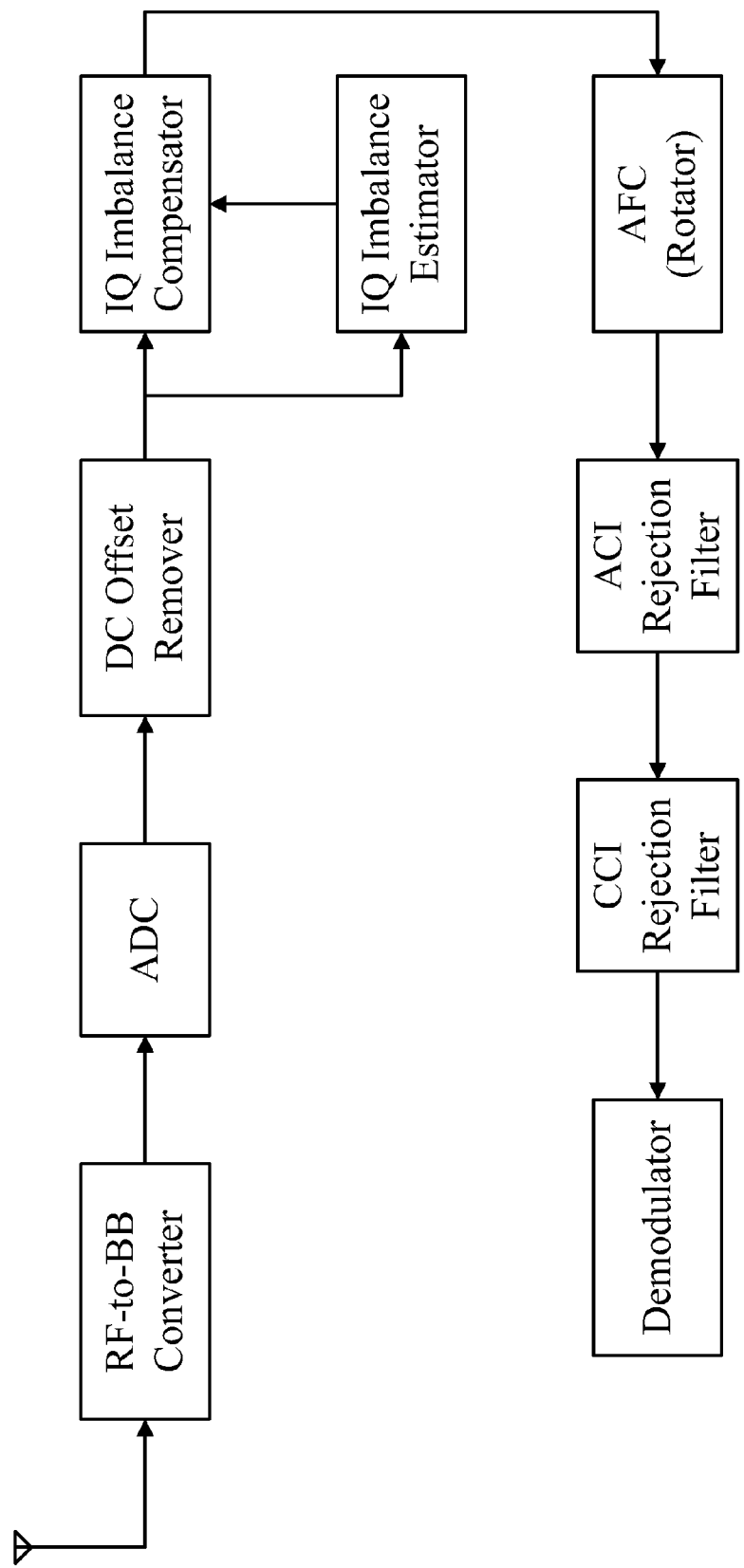
FIG. 1 is a schematic diagram of a receiver front end of a general baseband sampling digital receiver.

In a digital communication receiver, a so-called receiver front end is a device located in the front of a demodulator, independent of the demodulator, and used for improving the performance of the receiver. FIG. 1 schematically illustrates an example of the receiver front end of a general baseband sampling digital receiver.

As shown, the front end includes a DC offset remover, an IQ imbalance estimator, and an IQ imbalance compensator, an automatic frequency controller (AFC), and adjacent channel interference (ACI) rejection filter, a co-channel interference (CCI) rejection filter, and so on.

IQ imbalance occurs not only in the baseband sampling system. The so-called baseband sampling system means a system which A/D converts a signal with a center frequency of 0 and digitally demodulates the signal, such as a direct radio frequency (RF) receiver, a superheterodyne receiver or the like.

A baseband analog signal before being sampled (i.e. an input of ADC) is composed of a in-phase (I) signal and a quadrature (Q) signal. IQ imbalance occurs due to the imbalance between gains and phases of local oscillators for generating the I and Q signals.

In particular, the imbalance consists of the following two portions: crosstalk due to interference which is generated since the I signal flows into a Q-path; and the gain imbalance of the Q component which is generated in respect to the I signal gain.

Figure 2:
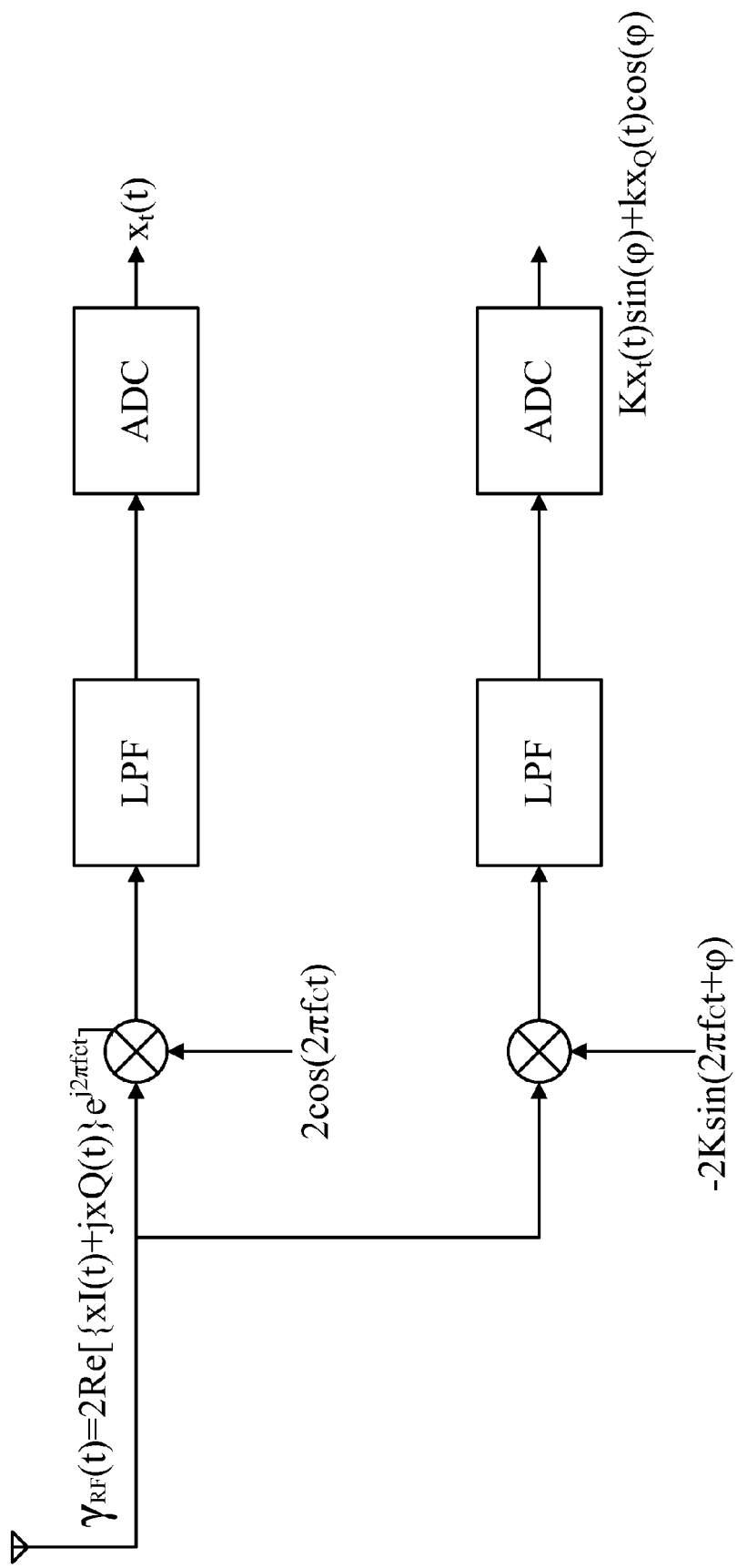
FIG. 2 is a schematic diagram of a model showing occurrence of IQ imbalance.

As shown in FIG. 2, the crosstalk is generated due to the phase imbalance of the local oscillators, and the gain imbalance of the Q component is generated due to the phase and gain imbalances of the local oscillators.

Assuming the input signal of the ADC is y(t), it can be expressed as follows:

$$y(t) = LPF[r_{RF}(t)\{2\sin(2\pi f_c t)\}] + \qquad \text{(Formula 1)}$$
$$LPF[r_{RF}(t)\{-2K\sin(2\pi f_c t + \varphi)\}]$$
$$= x_I(t) + j\{Kx_I(t)\sin\varphi + Kx_Q(t)\cos\varphi\}$$
$$= x_I(t) + j\{Cx_I(t) + Gx_Q(t)\}$$

where C is the crosstalk gain, and G is the Q-path gain.

The present invention provides a method for real-time estimating and compensating the crosstalk gain C and the Q-path gain G in time domain under the following two assumptions:

Assumption 1: $E[x_I^2(t)]=E[x_Q^2(t)]$. That is, the average powers of the I component and the Q component are the same.

Assumption 2: $E[x_I(t)x_Q(t)]=0$. That is, the I component and the Q component are uncorrelated.

The above two assumptions are valid for most communication systems using orthogonal modulation. In addition, they are valid for most communication systems using the orthogonal modulation and orthogonal frequency division multiplexing (OFDM).

Figure 3:
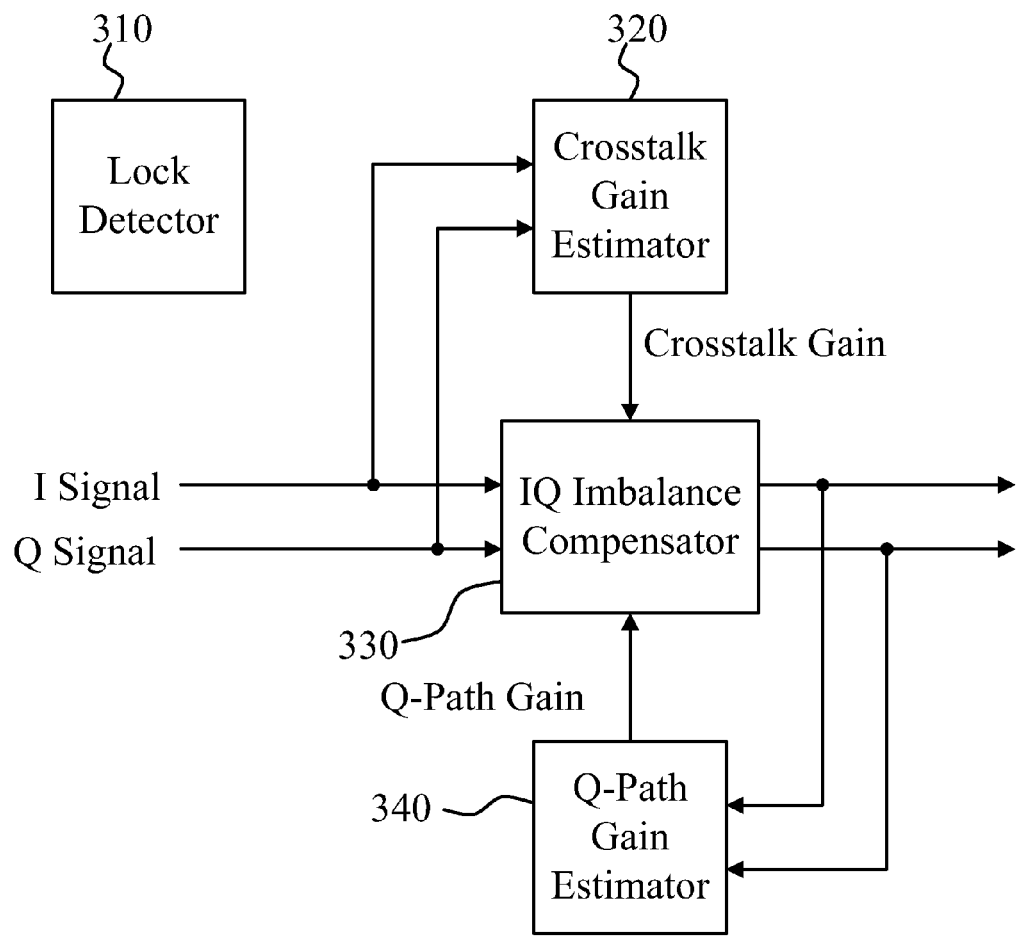
FIG. 3 is a diagram showing a structure of an IQ imbalance estimator and compensator of the present invention.

FIG. 3 schematically illustrates an IQ imbalance estimator/compensator 330 of the present invention. After A/D conversion, the IQ imbalance estimator/compensator 330 operates in digital time domain, and is usually located behind the ADC and the DC offset remover. The apparatus comprises a crosstalk gain estimator 320, a Q-path gain estimator 340, and an IQ imbalance compensator 330 and a lock detector 310.

The crosstalk estimator 320 is used to estimate the "C" in formula 1. The Q-path gain estimator 340 is used to estimate a reciprocal of the "G" in formula 1. The IQ imbalance 330 executes compensation to the IQ imbalance by using the estimated C and $G^{-1}$.

In addition, the IQ imbalance estimator/compensator 330 does not calculate the values of C and $G^{-1}$ directly. Instead, the residual crosstalk and gain mismatch of the Q signal are obtained by using a proper error detector, and the values of C and $G^{-1}$ are tracked by using a feedback method.

An input signal to the IQ imbalance estimator and compensator 330 of the present invention is assumed to be y(n), and is expressed as xI(n)+j{C×I(n)+G×Q(n)}, where n is the digital time index.

Figure 4:
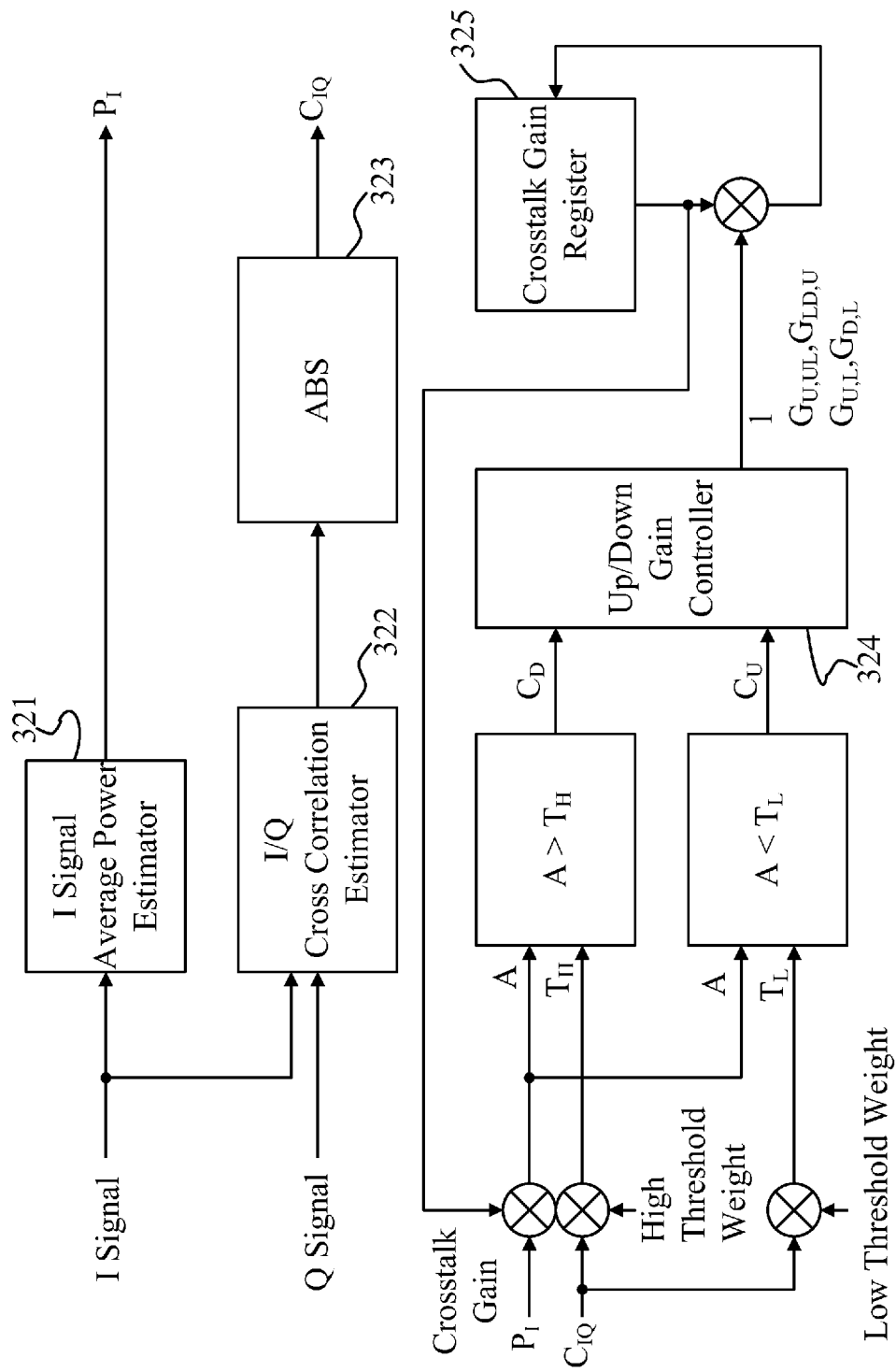
FIG. 4 is a diagram showing a structure of a crosstalk gain estimator in the IQ imbalance estimator of the present invention.

FIG. 4 schematically illustrates the crosstalk gain estimator 320 in the IQ imbalance estimator of the present invention. $P_I$ is the average power value of the I signal estimated by the I signal average power estimator 321. As an example, the real part of the estimator input y(n) is multiplied by itself, then the product is accumulated on a time axis, and an average thereof is calculated. The formula is expressed as:

$$P_I = E[\text{Re}\{y(n)\}] \qquad \text{(Formula 2)}$$
$$= \frac{1}{N}\sum_{n=0}^{N-1}[\text{Re}\{y(n)\}]^2$$

In the drawing, $C_{IQ}$ is a value obtained through the I/Q cross correlation estimator 322 and an absolute value (ABS) function device for calculating ABS, and it is used for estimating the cross correlation of the I signal and Q signal. As an example, the real part of the estimator input signal y(n) is multiplied by the imaginary part thereof, then the product is accumulated on a time axis, and an average thereof is calculated. The formula is expressed as:

$$C_{IQ} = |E[\text{Re}\{y(n)\}\text{Im}\{y(n)\}]| \qquad \text{(Formula 3)}$$
$$= \left|\frac{1}{N}\sum_{n=0}^{N-1}\text{Re}\{y(n)\}\text{Im}\{y(n)\}\right|$$

When there is crosstalk component existing in Im{y(n)}, according to Assumption 2, formula 3 becomes:

$$C_{IQ} = |E[\text{Re}\{y(n)\}\text{Im}\{y(n)\}]| \qquad \text{(Formula 4)}$$
$$= |E[x_I(n)\{Cx_I(n) + Gx_Q(n)\}]|$$
$$= CE[x_I^2(n)]$$
$$= CP_I$$

Accordingly, when the crosstalk gain C is accurately estimated, the values of $CP_I$ and $C_{IQ}$ should be the same. The error detector utilizes such feature of the crosstalk gain estimator in accordance with the present invention.

In the crosstalk estimator 320 of the present invention, an up/down gain controller 324 is inputted with the outputs $C_U$ and $C_D$ from the error detector so as to output a gain value for increasing or decreasing the crosstalk gain value.

When $CP_I$ is greater than a high threshold $T_H$, $C_D$ is 1 and $C_U$ is 0, and $G_{D,UL}$ or $G_{D,L}$ is/valued? less than 1 is outputted so as to decrease the gain. Conversely, when $CP_I$ is less than a low threshold $T_L$, $C_D$ is 0 and $C_U$ is 1, and $G_{D,UL}$ or $G_{D,L}$ greater than 1 is outputted so as to increase the gain.

In cases other than the above-mentioned two conditions, $C_D$ and $C_U$ are both 0, and the crosstalk gain remains unchanged. The reason for setting the thresholds is that when the inputs $P_I$ and $C_{IQ}$ of the up/down gain controller 324 slightly oscillate due to simple estimation errors, the thresholds are used to scale the gain.

$G_{U,UL}$ and $G_{D,UL}$ are values used when the lock detector 310 in FIG. 2 is at the "unlock" state, so as to increase the gain scaling extent. $G_{U,L}$ and $G_{D,L}$ are values used at the "lock" state for decreasing the gain scaling extent.

For example, $G_{U,UL}$ and $G_{D,UL}$ can be respectively set as 0.8, 1.2, while $G_{U,L}$ and $G_{D,L}$ can be respectively set as 0.99, 1.01. The high and low thresholds are obtained by respectively multiplying $C_{IQ}$ by a high threshold weight and a low threshold weight. The high threshold weight is greater than 1, while the low threshold weight is less than 1. For example, the high threshold weight can beset as 1.15, while the low threshold weight can be set as 0.85.

Figure 5:
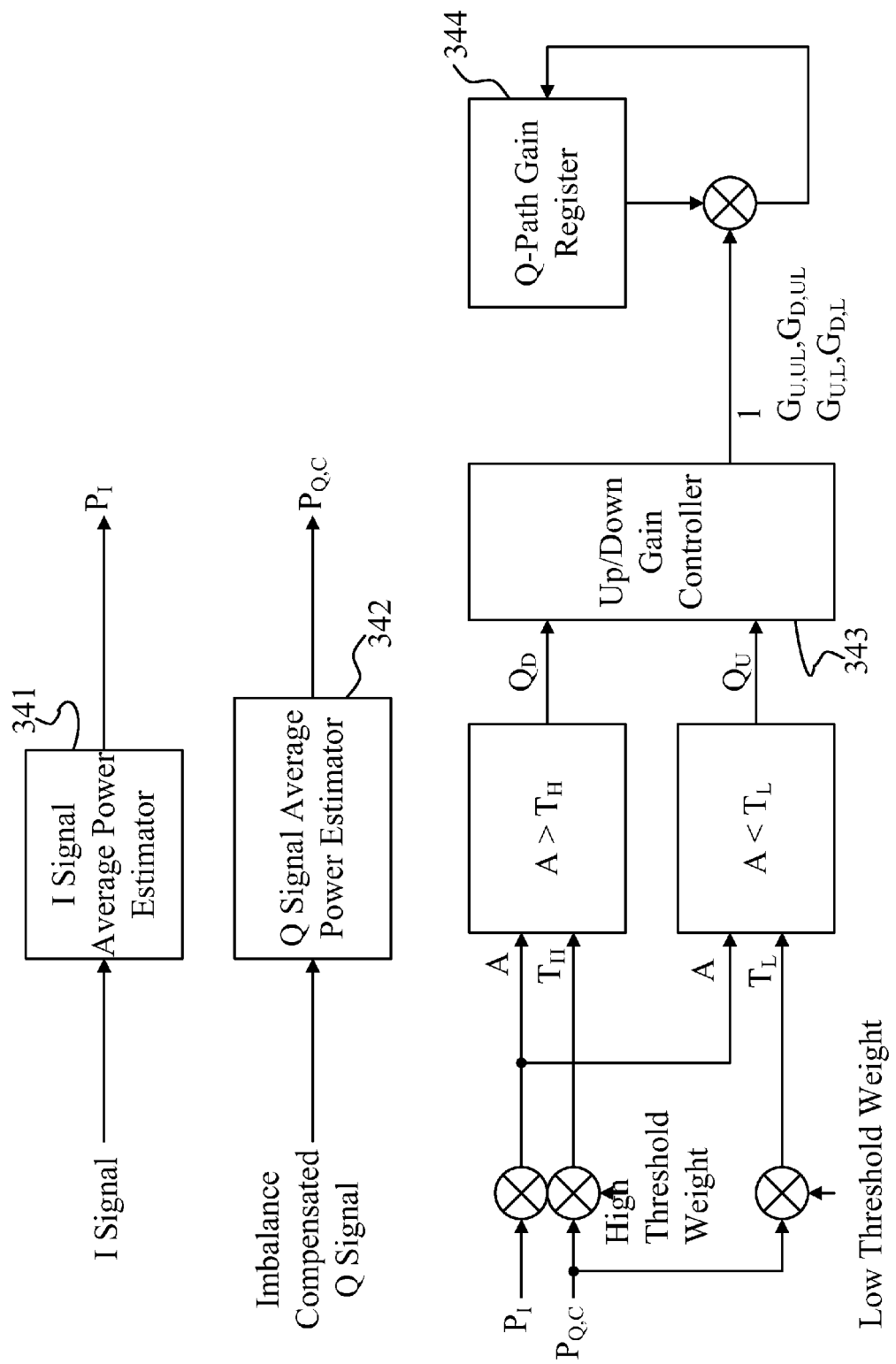
FIG. 5 is a diagram showing a structure of a Q-path gain estimator.
Figure 6:
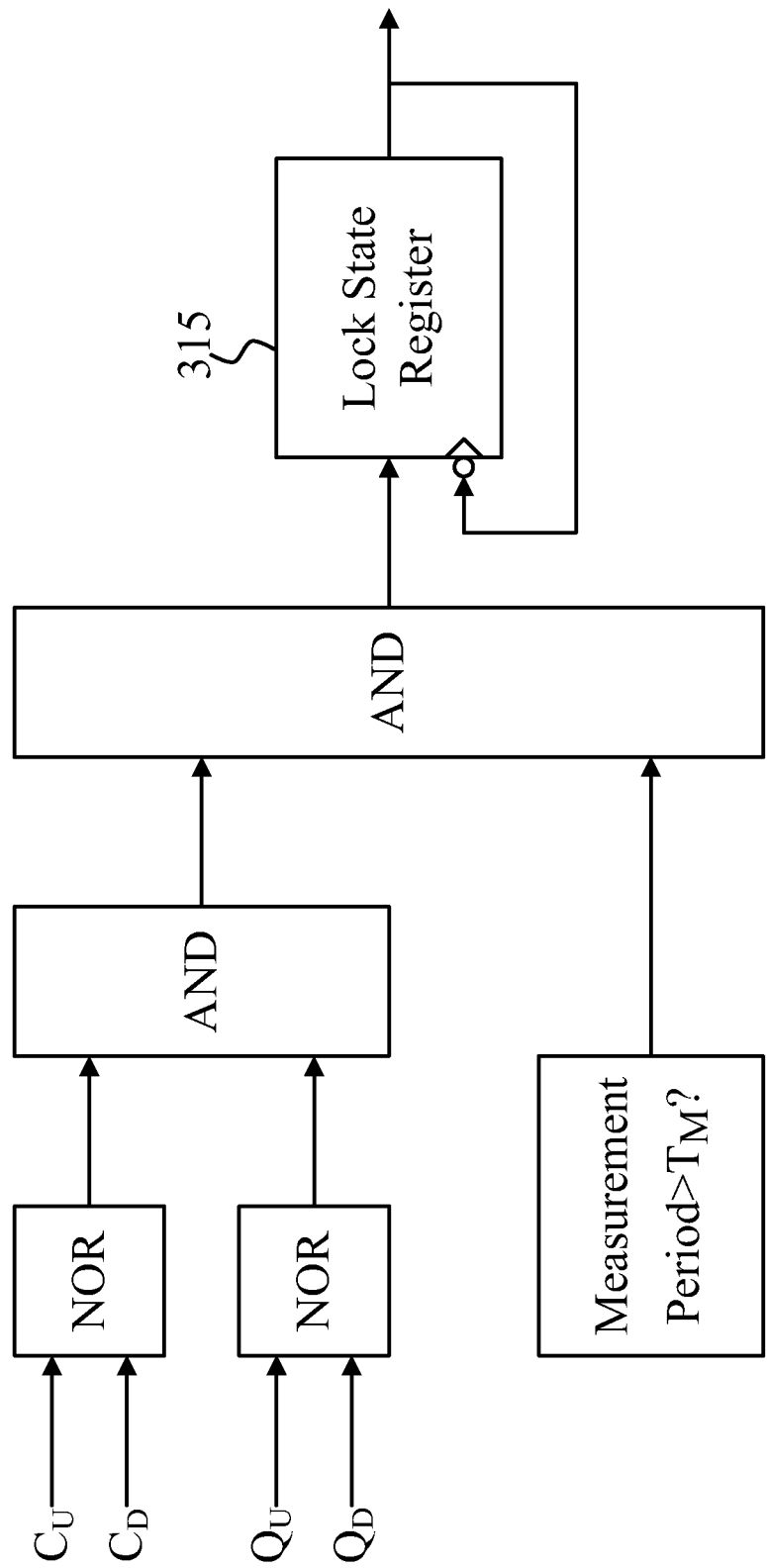
FIG. 6 is a diagram showing a structure of a lock detector.

When the compensation result for IQ imbalance is perfect, the average power of the I signal and the average power of the Q signal should be the same. The error detector of the Q-path gain estimator 340 in accordance with the present invention (FIG. 5) utilizes such feature. In FIG. 5, $P_Q$, C are values obtained through a Q signal average power estimator detecting the average power of the IQ imbalance compensated Q signal. As an example, the imaginary part of the estimator input signal yC(n) can be multiplied by itself, the product can be accumulated in the time axis, and the average thereof is calculated. The formula is expressed as follows:

$$P_{Q,C} = E[\text{Im}\{y_C(n)\}] \qquad \text{(Formula 5)}$$
$$= \frac{1}{N} \sum_{n=0}^{N-1} [\text{Im}\{y_C(n)\}]^2$$

In the Q-path gain estimator 340 of the present invention, the outputs $Q_U$, $Q_D$ of the error detector are inputted to the up/down gain controller 343, so that the up/down gain controller 343 outputs the gain value required for increasing or decreasing the Q-path gain.

When $P_I$ is greater than the high threshold $T_H$, $Q_U$ is 1 and $Q_D$ is 0, $G_{U,UL}$ or $G_{U,L}$, which is greater than 1, is outputted to increase the gain. Conversely, when $P_I$ is less than the low threshold $T_L$, $Q_U$ is 0 and $Q_D$ is 1, $G_{D,UL}$ or $G_{D,L}$ less than 1 is outputted to decrease the gain.

In cases other than the above-mentioned two conditions, $Q_U$ and $Q_D$ are both 0, and the Q-path gain remains unchanged. The reason for setting the thresholds is that when the inputs $P_I$, $P_Q$ and C of the up/down gain controller 343 slightly oscillate due to simple estimation errors, the thresholds are used to scale the gain.

$G_{U,UL}$ and $G_{D,UL}$ are values used when the lock detector 310 in FIG. 2 is at the "unlock" state, so as to increase the gain scaling extent. $G_{U,L}$ and $G_{D,L}$ are values used at the "lock" state for decreasing the gain scaling extent. For example, $G_{U,UL}$ and $G_{D,UL}$ can be respectively set as 0.8, 1.2, while $G_{U,L}$ and $G_{D,L}$ can be respectively set as 0.99, 1.01.

These four values can be the same as or different from those used in the up/down gain controller 324 of the crosstalk gain estimator 320. The high and low thresholds are obtained by respectively multiplying $P_Q$ and C by a high threshold weight and a low threshold weight. The high threshold weight is greater than 1, while the low threshold weight is less than 1. For example, the high threshold weight can be set as 1.15, while the low threshold weight can be set as 0.85. These two values can be the same as or different from those used in the crosstalk gain estimator 320.

The lock detector 310 of the present invention is a device used to determine whether the IQ imbalance estimator and compensator 330 achieves a stable state, in which the IQ imbalance estimator and compensator 330 operates stably.

The lock state register 315 serves for indicating the "unlock" state and the "lock" state. The "unlock" state can be switched to "lock" state. However, at the "lock" state, it is not possible to return to the "unlock" state without system resetting.

The condition for switching from the "unlock" state to the "lock" state is as follows: the outputs $C_U$, $C_D$, $Q_U$, $Q_D$ of the error detectors of the crosstalk gain estimator and the Q-path gain estimator are all 0, and the total measurement period is longer than a predetermined period $T_M$. At the "lock" state, the crosstalk gain and the Q-path gain can be used with or without being updated.

Figure 7:
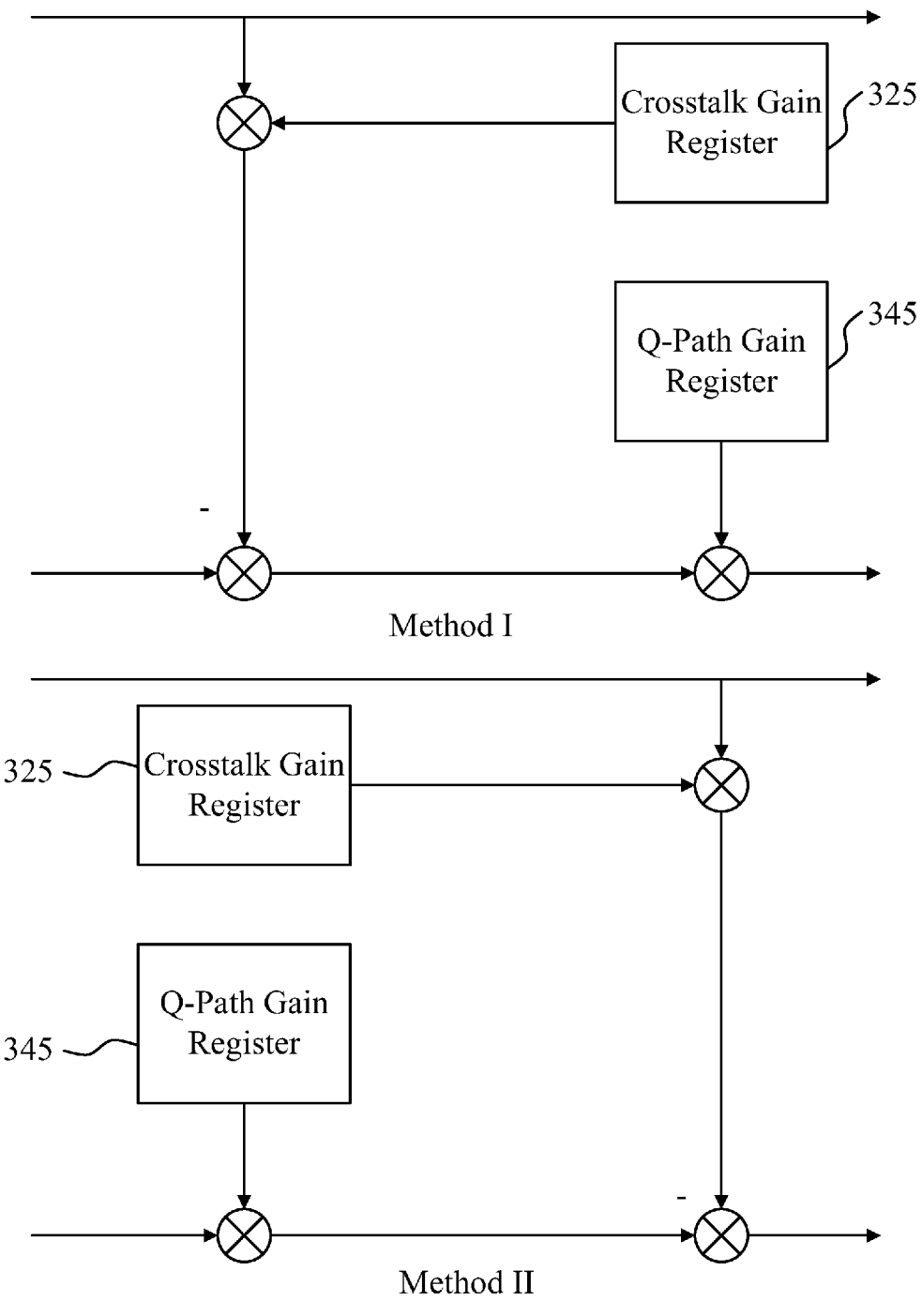
FIG. 7 is a diagram showing a structure of the IQ imbalance compensator using outputs of the IQ imbalance estimator as a crosstalk gain and a Q-path gain.

FIG. 7 schematically illustrates the IQ imbalance compensator 320 of the present invention, which uses the outputs of the IQ imbalance estimator as the crosstalk gain and the Q-path gain. There are Method I and Method II. In Method I, the crosstalk is compensated first and then the Q-path gain is compensated. Method II is contrary to Method I. In Method II, the Q-path gain is compensated first, and then the crosstalk gain is compensated.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. An IQ imbalance estimating and compensating method for a baseband sampling system, characterized in that said method comprises:

providing an IQ imbalance estimator and compensator which comprises a crosstalk gain estimator, a Q-path gain estimator, an IQ imbalance compensator, a lock detector, the IQ imbalance estimator and compensator being disposed after an analog-to-digital converter (ADC) and a DC offset remover, and the crosstalk gain estimator being utilized for estimating a crosstalk gain value, and the Q-path gain estimator being utilized for estimating a reciprocal of Q-path gain value, and the IQ imbalance estimator and compensator being utilized for executing IQ imbalance estimation and compensation through the crosstalk gain value and the reciprocal of Q-path gain value.

2. The IQ imbalance estimating and compensating method of claim 1, characterized in that:

in the crosstalk estimator, multiplying an average power of an in-phase (I) signal by the crosstalk gain value; comparing with a cross correlation value of the I signal and a quadrature (Q) signal; decreasing a crosstalk gain by a predetermined gain scaling value and updating the decreased crosstalk gain to a crosstalk gain register when the compared result is greater than a high threshold weight, while increasing the crosstalk gain by the predetermined gain scaling value and updating the increased crosstalk gain to the crosstalk gain register when the compared result is less than a low threshold weight, and maintaining the crosstalk gain unchanged when the compared result is greater than the low threshold weight and less than the high threshold weight.

3. The IQ imbalance estimating and compensating method of claim 2, characterized in that:

the average power of the I signal and the cross correlation value of the I and Q signals are obtained though the following formulas 2 and 3:

$$P_I = E[\text{Re}\{y(n)\}] \quad \text{(formula 2)}$$
$$= \frac{1}{N}\sum_{n=0}^{N-1}[\text{Re}\{y(n)\}]^2$$

$$C_{IQ} = |E[\text{Re}\{y(n)\}\text{Im}\{y(n)\}]| \quad \text{(formula 3)}$$
$$= \left|\frac{1}{N}\sum_{n=0}^{N-1}\text{Re}\{y(n)\}\text{Im}\{y(n)\}\right|.$$

4. The IQ imbalance estimating and compensating method of claim 2, characterized in that:
the high threshold weight is greater than 1, and the low threshold weight is less than 1.

5. The IQ imbalance estimating and compensating method of claim 2, characterized in that:
the predetermined gain scaling value used in the condition of decreasing the crosstalk gain is set to be less than 1.

6. The IQ imbalance estimating and compensating method of claim 5, characterized in that:
the gain scaling value is dissimilarly set according to a state of the lock detector.

7. The IQ imbalance estimating and compensating method of claim 6, characterized in that:
the gain scaling value when the lock detector is at an "unlock" state is set to be less than the gain scaling value when the lock detector is at a "lock" state.

8. The IQ imbalance estimating and compensating method of claim 2, characterized in that:
the predetermined gain scaling value used in the condition of increasing the crosstalk gain is set to be greater than 1.

9. The IQ imbalance estimating and compensating method of claim 8, characterized in that:
the gain scaling value is dissimilarly set according to a state of the lock detector.

10. The IQ imbalance estimating and compensating method of claim 1, characterized in that:
in the Q-path estimator, comparing an average power of an-phase (I) signal with an average power of a quadrature (Q) signal, of which an imbalance has been compensated; increasing a Q-path gain by a predetermined gain scaling value and updating the increased Q-path gain to a Q-path gain register when the compared result is greater than a high threshold weight, while decreasing the Q-path gain by the predetermined gain scaling value and updating the decreased Q-path gain to the Q-path gain register when the compared result is less than a low threshold weight, and maintaining the Q-path gain unchanged when the compared result is greater than the low threshold weight and less than the high threshold weight.

11. The IQ imbalance estimating and compensating method of claim 10, characterized in that:
the average power of the I signal and the average power of the Q signals are obtained though the following formulas 2 and 5:

$$P_I = E[\text{Re}\{y(n)\}] \quad \text{(formula 2)}$$
$$= \frac{1}{N}\sum_{n=0}^{N-1}[\text{Re}\{y(n)\}]^2$$

-continued
$$P_{Q,C} = E[\text{Im}\{y_C(n)\}] \quad \text{(formula 5)}$$
$$= \frac{1}{N}\sum_{n=0}^{N-1}[\text{Im}\{y_C(n)\}]^2.$$

12. The IQ imbalance estimating and compensating method of claim 10, characterized in that:
the high threshold weight is greater than 1, and the low threshold weight is less than 1.

13. The IQ imbalance estimating and compensating method of claim 10, characterized in that:
the predetermined gain scaling value used in the condition of decreasing the Q-path gain is set to be less than 1.

14. The IQ imbalance estimating and compensating method of claim 13, characterized in that:
the gain scaling value is dissimilarly set according to a state of the lock detector.

15. The IQ imbalance estimating and compensating method of claim 14, characterized in that:
the gain scaling value when the lock detector is at an "unlock" state is set to be less than the gain scaling value when the lock detector is at a "lock" state.

16. The IQ imbalance estimating and compensating method of claim 10, characterized in that:
the predetermined gain scaling value used in the condition of increasing the Q-path gain is set to be greater than 1.

17. The IQ imbalance estimating and compensating method of claim 16, characterized in that:
the gain scaling value when the lock detector is at an "unlock" state is set to be greater than the gain scaling value when the lock detector is at a "lock" state.

18. The IQ imbalance estimating and compensating method of claim 1, characterized in that:
the lock detector operates as follows:
conditions for switching from an "unlock" state to a "lock" state are set as: a crosstalk gain in the crosstalk gain estimator is not updated and remains unchanged, a Q-path gain in the Q-path gain estimator is not updated and remains unchanged, and a total IQ imbalance measurement period is longer than a predetermined period; and
switching from the "lock" state to the "unlock" state can only be done by system resetting.

19. The IQ imbalance estimating and compensating method of claim 18, characterized in that:
updating values of a crosstalk gain register and a Q-path gain register when the lock detector is at the "unlock" state.

20. The IQ imbalance estimating and compensating method of claim 18, characterized in that:
updating values of a crosstalk gain register and a Q-path gain register when the lock detector is at the "lock" state.

21. The IQ imbalance estimating and compensating method of claim 18, characterized in that:
no more updating values of a crosstalk gain register and a Q-path gain register when the lock detector is at the "lock" state.

22. The IQ imbalance estimating and compensating method of claim 1, characterized in that:
in the IQ imbalance compensator, multiplying a value of a crosstalk gain register by a value of an in-phase (I) signal to obtain a crosstalk component, removing the obtained crosstalk component from a quadrature (Q) signal, and then multiplying the crosstalk removed Q signal by a value of a Q-path gain register so as to compensate a gain of a Q-path.

23. The IQ imbalance estimating and compensating method of claim 1, characterized in that:
in the IQ imbalance compensator, multiplying a quadrature (Q) signal by a value of a Q-path gain register to compensate a gain of a Q-path, multiplying a value of a crosstalk gain register by an in-phase (I) signal to obtain a crosstalk component, removing the crosstalk component from the compensated Q signal to carry out compensation.

* * * * *